(12) United States Patent
Tani et al.

(10) Patent No.: US 8,947,989 B2
(45) Date of Patent: Feb. 3, 2015

(54) WOBBLE DETERMINING APPARATUS AND METHOD, OPTICAL DISK DEVICE, AND COMPUTER PROGRAM

(75) Inventors: Takashi Tani, Yokohama (JP); Yoshinori Kajiwara, Yaita (JP); Wataru Terui, Yokohama (JP); Takahiro Otomo, Yaita (JP)

(73) Assignee: Pioneer Digital Design and Manufacturing Corporation, Kanagawa (JP)

( * ) Notice: Subject to any disclaimer, the term of this patent is extended or adjusted under 35 U.S.C. 154(b) by 0 days.

(21) Appl. No.: 14/127,980

(22) PCT Filed: Jun. 20, 2011

(86) PCT No.: PCT/JP2011/064050
§ 371 (c)(1),
(2), (4) Date: Mar. 25, 2014

(87) PCT Pub. No.: WO2012/176263
PCT Pub. Date: Dec. 27, 2012

(65) Prior Publication Data
US 2014/0223456 A1    Aug. 7, 2014

(51) Int. Cl.
G11B 7/00     (2006.01)
G11B 20/10    (2006.01)
G11B 19/12    (2006.01)
G11B 19/247   (2006.01)

(52) U.S. Cl.
CPC .......... *G11B 20/10342* (2013.01); *G11B 19/12* (2013.01); *G11B 19/247* (2013.01)
USPC .................. 369/44.13; 369/44.27; 369/47.55; 369/53.29; 369/53.33; 369/53.39; 369/53.43; 720/660; 720/663

(58) Field of Classification Search
None
See application file for complete search history.

(56) References Cited

FOREIGN PATENT DOCUMENTS

| JP | 07-192390 | 7/1995 |
|---|---|---|
| JP | 2000-322742 | 11/2000 |
| JP | 2002-367168 | 12/2002 |
| JP | 2006-268927 | 10/2006 |
| JP | 2007-042148 | 2/2007 |

OTHER PUBLICATIONS

International Search Report PCT/JP2011/064050 dated Sep. 27, 2011, with English Translation.

*Primary Examiner* — Wayne Young
*Assistant Examiner* — Brian Butcher
(74) *Attorney, Agent, or Firm* — Young & Thompson (57) ABSTRACT

A wobble determining apparatus is provided with: a calculating device for calculating (i) a first time required until reaching a number of revolutions of a motor which allows a predetermined linear velocity, and (ii) a second time required to move an optical head to a position which allows the predetermined linear velocity, on the basis of the number of revolutions of the motor and the position of the optical head; a judging device for judging whether to keep the optical head in accordance with the calculated first time and the calculated second time; and a controlling device for controlling a moving device not to move the optical head if it is judged to keep the optical head, and for controlling the moving device to move the optical head to the position which allows the predetermined linear velocity if it is judged not to keep the optical head.

7 Claims, 4 Drawing Sheets

WOBBLE DETERMINING APPARATUS AND METHOD, OPTICAL DISK DEVICE, AND COMPUTER PROGRAM

TECHNICAL FIELD

The present invention relates to, for example, a wobble determining apparatus and method which can detect the presence or absence of a wobble signal, an optical disk apparatus which is provided with the wobble determining apparatus, and a computer program.

BACKGROUND ART

As this type of apparatus, for example, there has been proposed an apparatus for determining the type of an optical disc by extracting a wobble component from a tracking error signal and comparing an average period or cycle of the extracted wobble component with a predetermined threshold value to confirm the presence or absence of a wobble (refer to Patent Document 1).

Alternatively, there has been proposed an apparatus for determining the optical disc by moving an optical head to a predetermined position of the optical disc, with the number of revolutions of the optical disc being set to be a predetermined number of revolutions, extracting the wobble component from the tracking error signal, and measuring the period of the extracted wobble component (refer to Patent Document 2).

Alternatively, there has been proposed an apparatus for differentiating between a recording disc and a reproduction-only disc on the basis of whether or not the wobble is detected. Here, in particular, it is described that the trace position of the optical head is set at a predetermined position in a radial direction of the disc during the disc determination, and that the wobble is detected by changing the number of revolutions with a focus on a predetermined number of revolutions corresponding to the predetermined position (refer to Patent Document 3).

Alternatively there has been proposed an apparatus for determining whether or not to be an optical disc of a standard corresponding to a specified wobble frequency, on the basis of a change in the period of the wobble signal with respect to a change in the number of revolutions of the optical disc (refer to Patent Document 4).

PRIOR ART DOCUMENT

Patent Document

Patent document 1: Japanese Patent Application Laid Open No. 2007-42148
Patent document 2: Japanese Patent Application Laid Open No. 2000-322742
Patent document 3: Japanese Patent Application Laid Open No. 2002-367168
Patent document 4: Japanese Patent Application Laid Open No. 2006-268927

DISCLOSURE OF INVENTION

Subject to be Solved by the Invention

By the way due to a thin disk drive of a reproducing apparatus and a recording apparatus or the like of the optical disc, a spindle motor which is mounted on the disk drive is also designed to be thin. Since the thin spindle motor has relatively small power output, it takes a relatively long time to increase the number of revolutions of the spindle motor up to the predetermined number of revolutions. Therefore, for example, there is such a technical problem that it requires a relatively long period of time to detect the presence or absence of the wobble signal. The period which is required to detect the presence or absence of the wobble signal is not considered in the aforementioned background art, which makes it difficult to solve the technical problem.

In view of the aforementioned problem, it is therefore an object of the present invention to provide a wobble determining device and method which can detect the presence or absence of the wobble signal at a relatively early stage, an optical disk apparatus, and a computer program.

Means for Solving the Subject

The above object of the present invention can be achieved by a wobble determining apparatus which is mounted on an optical disk apparatus, the optical disk apparatus comprising: a motor which can rotate an optical disc, an optical head which can record information on the optical disc or which can read the information recorded on the optical disc, and a moving device which can move the optical head at least along a recording surface of the optical disc, said wobble determining apparatus is provided with a number-of-revolutions detecting device for detecting the number of revolutions of the motor; a position detecting device for detecting a position of the optical head with respect to the optical disc; a calculating device for calculating (i) a first time, which is a time length required until reaching a number of revolutions of the motor which allows a predetermined linear velocity at the detected position, and (ii) a second time, which is a time length required to move the optical head to a position which allows the predetermined linear velocity with the detected number of revolutions, on the basis of the detected number of revolutions and the detected position; a judging device for judging whether or not to keep the optical head at the detected position in accordance with the calculated first time and the calculated second time; and a controlling device for controlling the moving device not to move the optical head if it is judged to keep the optical head at the detected position, and for controlling the moving device to move the optical head to the position which allows to the predetermined linear velocity if it is judged not to keep the optical head at the detected position.

According to the wobble determining apparatus of the present invention, the wobble determining apparatus is mounted on the optical disk apparatus which is provided with: the motor which can rotate the optical disc, the optical head which can record information on the optical disc or which can read the information recorded on the optical disc, and the moving device which can move the optical head at least along a recording surface of the optical disc.

Incidentally, the optical disk apparatus of the present invention can adopt either of a constant angular velocity (CAV) method and a constant linear velocity (CLV) method.

The number-of-revolutions detecting device detects the number of revolutions of the motor. The position detecting device detects the position of the optical head with respect to the optical disc.

The calculating device, which is provided, for example, with a memory, a processor, and the like, calculates the first time, which is the time length required until reaching the number of revolutions of the motor which allows the predetermined linear velocity at the detected position, on the basis of the detected number of revolutions and the detected position of the optical head. The "predetermined linear velocity" means a linear velocity at which the wobble signal and a reference signal can be appropriately compared. Incidentally, an increasing rate of the number of revolutions of the motor is uniquely determined in accordance with characteristics of the motor.

The calculating device further calculates the second time, which is the time length required to move the optical head to the position which allows the predetermined linear velocity with the detected number of revolutions, on the basis of the detected number of revolutions and the detected position of the optical head.

According to the study of the present inventors, the following matter has been revealed. Namely, most optical disk apparatuses adopt a method of detecting the presence or absence of the wobble signal in order to differentiate between the recording type optical disc such as, for example, BD-R/-RE (Blu-ray Disc Recordable/Rewritable), and the reproduction-only optical disc such as, for example, a BD-ROM (Blu-ray Disc Read Only Memory). In order to accurately detect the presence or absence of the wobble signal, it is necessary to set the number of revolutions of the optical disc to the number of revolutions which allows the predetermined linear velocity, in accordance with the position of the optical head.

By the way, with thinning the optical disk apparatus, the motor which is mounted on the optical disk apparatus is also designed to be thin. In addition, voltage applied to the optical disk apparatus is also set to be relatively low, such as, for example, 5V. It thus takes more time until the number of revolutions of the motor reaches a predetermined number of revolutions, in comparison with a so-called half-height (i.e. 4.06 cm) optical disk apparatus. Then, it takes a relatively long time to detect the wobble signal, thereby causing a relatively long start-up period.

In the present invention, however, the judging device, which is provided, for example, with a memory, a processor, a comparator, and the like, judges whether or not to keep the optical head at the detected position in accordance with the calculated first time and the calculated second time. Then, the controlling device, which is provided, for example, a memory, a processor, and the like, controls the moving device not to move the optical head if it is judged to keep the optical head at the detected position, and controls the moving device to move the optical head to the position which allows the predetermined linear velocity (typically, to an outer circumferential portion of the optical disc) if it is judged not to keep the optical head at the detected position.

As a result, it is possible to obtain the predetermined linear velocity at a relatively early stage, thereby detecting the presence or absence of the wobble signal at a relatively early stage.

In one aspect of the wobble determining apparatus of the present invention, said judging device judges to keep the optical head at the detected position if the calculated first time is less than the calculated second time, and judges not to keep the optical head at the detected position if the calculated first time is greater than the calculated second time.

According to this aspect, it is possible to judge whether or not to keep the optical head at the detected position, relatively easily, which is extremely useful in practice.

Alternatively, in another aspect of the wobble determining apparatus of the present invention, said judging device judges to keep the optical head at the detected position if the calculated first time is less than a time which is twice the calculated second time, and judges not to keep the optical head at the detected position if the calculated first time is greater than the time which is twice the calculated second time.

According to this aspect, it is possible to set a relatively short start-up period, which is extremely useful in practice.

The study of the present inventors has revealed that in the optical disk apparatus, in order to determine the type of the disc or perform similar actions, the optical head is moved to an inner circumferential portion of the optical disc after the detection of the presence or absence of the wobble signal, and for example, burst cutting area (BCA) information and permanent information & control data (PIC) information or the like are read.

In other words, if the optical head is moved to the outer circumferential portion of the optical disc in order to detect the presence or absence of the wobble signal at a relatively early stage, it is necessary to move the optical head to the inner circumferential portion of the optical disc again in order to read, for example, the BCA information or the like. Thus, if the optical head is moved to detect the presence or absence of the wobble signal, the entire start-up period likely becomes longer than the case where the optical head is not moved.

In the present invention, however, the judging device judges whether or not to move the optical head in order to detect the presence or absence of the wobble signal in response to a result of the comparison between the first time and the time which is twice the second time. It is thus possible to set the relatively short start-up period.

In another aspect of the wobble determining apparatus of the present invention, said calculating device calculates, as the second time, a sum of a time which is required to move the optical head to an outermost circumferential portion of the optical disc, and a time which is required until reaching the number of revolutions of the motor which allows the predetermined linear velocity in the outer most circumferential portion, if the position which allows the predetermined linear velocity is outer than the outermost circumferential portion.

According to this aspect, the second time can be appropriately calculated even if the number of revolutions of the motor is relatively low and if the position which allows the predetermined linear velocity with the detected number of revolutions is outer than the outermost circumferential portion of the optical disc.

The above object of the present invention can be achieved by a wobble determining method in a wobble determining apparatus which is mounted on an optical disk apparatus, the optical disk apparatus comprising: a motor which can rotate an optical disc, an optical head which can record information on the optical disc or which can read the information recorded on the optical disc, and a moving device which can move the optical head at least along a recording surface of the optical disc, said wobble determining method is provided with a number-of-revolutions detecting process of detecting the number of revolutions of the motor; a position detecting process of detecting a position of the optical head with respect to the optical disc; a calculating process of calculating (i) a first time, which is a time length required until reaching a number of revolutions of the motor which allows a predetermined linear velocity at the detected position, and (ii) a second time, which is a time length required to move the optical head to a position which allows the predetermined linear velocity with the detected number of revolutions, on the basis of the detected number of revolutions and the detected position; a judging process of judging whether or not to keep the optical head at the detected position in accordance with the calculated first time and the calculated second time; and a controlling process of controlling the moving device not to move the optical head if it is judged to keep the optical head at the detected position, and for controlling the moving device to move the optical head to the position which allows the predetermined linear velocity if it is judged not to keep the optical head at the detected position.

According to the wobble determining method of the present invention, as in the wobble determining apparatus of the present invention, it is possible to detect the presence or absence of the wobble signal at a relatively early stage.

Incidentally the wobble determining method of the present invention can adopt the same various aspects as those of the wobble determining apparatus of the present invention.

The above object of the present invention can be achieved by an optical disk apparatus is provided with a motor which can rotate an optical disc; an optical head which can record information on the optical disc or which can read the information recorded on the optical disc; a moving device which can move the optical head at least along a recording surface of the optical disc; a number-of-revolutions detecting device for detecting the number of revolutions of the motor; a position detecting device for detecting a position of the optical head with respect to the optical disc; a calculating it device for calculating (i) a first time, which is a time length required until reaching a number of revolutions of the motor which allows a predetermined linear velocity at the detected position, and (ii) a second time, which is a time length required to move the optical head to a position which allows the predetermined linear velocity with the detected number of revolutions, on the basis of the detected number of revolutions and the detected position; a judging device for judging whether or not to keep the optical head at the detected position in accordance with the calculated first time and the calculated second time; and a controlling device for controlling the moving device not to move the optical head if it is judged to keep the optical head at the detected position, and for controlling the moving device to move the optical head to the position which allows the predetermined linear velocity if it is judged not to keep the optical head at the detected position.

According to the optical disk apparatus of the present invention, as in the wobble determining apparatus of the present invention, it is possible to detect the presence or absence of the wobble signal at a relatively early stage.

Incidentally, the optical disk apparatus of the present invention can adopt the same various aspects as those of the wobble determining apparatus of the present invention.

The above object of the present invention can be achieved by a computer program for making a computer function as the wobble determining apparatus of the present invention (comprising various aspects of it)

According to the computer program of the present invention, the wobble determining apparatus of the present invention described above can be relatively easily realized as the computer, which is mounted on the wobble determining apparatus, reads and executes the computer program from a recording medium for storing the computer program, such as a compact disc read only memory (CD-ROM) a DVD read only memory (DVD-ROM), or as it executes the computer program after downloading the program through a communication device. This makes it possible to detect the presence or absence of the wobble signal at a relatively early stage, as in the wobble determining apparatus of the present invention.

The operation and other advantages of the present invention will become more apparent from an embodiment explained below.

MODE FOR CARRYING OUT THE INVENTION

Hereinafter, a wobble determining apparatus and an optical disk apparatus in an embodiment of the present invention will be explained with reference to the drawings. Incidentally, in the drawings below, each member has a different scale in order to make each member large enough to be recognized on the drawings.

(Configuration of Optical Drive)

Figure 1:
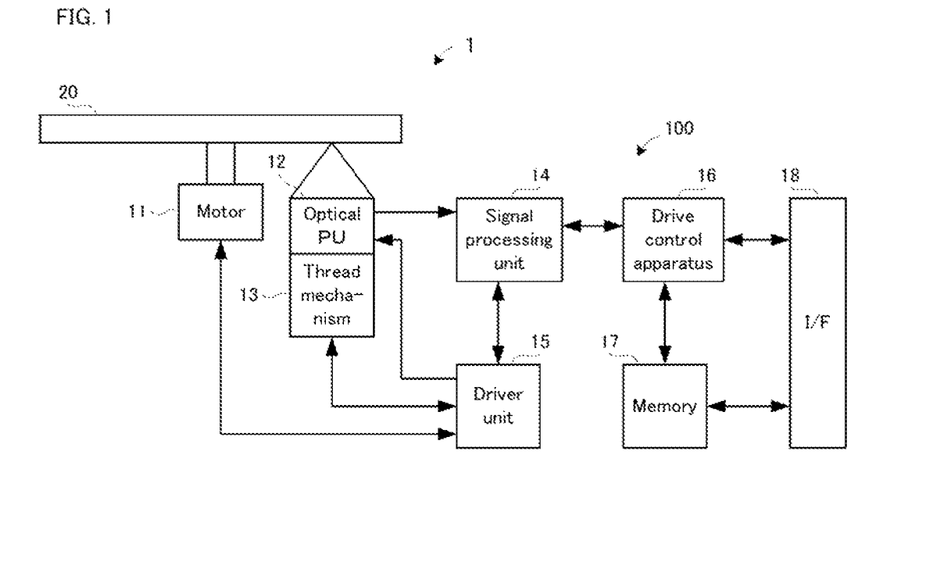
FIG. 1 is a block diagram illustrating a configuration of an optical drive in an embodiment of the present invention.

Firstly, a configuration of an optical drive which is one example of the "optical disk apparatus" of the present invention will be explained with reference to FIG. 1. FIG. 1, is a block diagram illustrating the configuration of the optical drive in an embodiment.

In FIG. 1, an optical drive 1 is provided with a spindle motor 11 which can rotate an optical disc 20, an optical pickup 12, a thread mechanism 13 which can move the optical pickup 12 at least in a direction along a recording surface of the optical disc 20, a signal processing unit 14, a driver unit 15 which can control each of the spindle motor 11, the optical pickup 12 and the thread mechanism 13, a drive control apparatus 16, a memory 17, and an interface (I/F) 18.

The spindle motor 11 has a built-in apparatus which detects the number of revolutions of the spindle motor 11, such as, for example, a hall element and a light emitting and receiving element (not illustrated) (hereinafter referred to as a "number-of-revolutions sensor" as occasion demands). Moreover, the thread mechanism 13 has a built-in apparatus which detects the position of the thread mechanism 13, such as, for example, a rotary encoder (not illustrated) (hereinafter referred to as a "position sensor" as occasion demands). Various known aspects can be applied to a method of detecting the number of revolutions of the spindle motor 11 and a method of detecting the position of the thread mechanism 13, and thus, the explanation of the details thereof is omitted here.

A wobble determining apparatus 100 is provided with the number-of-revolutions sensor, the position sensor, the drive control apparatus 16 and the memory 17.

(Disc Determination Processing)

Next, disc type determination processing performed by the optical drive 1 as configured above will be explained with reference to a flowchart in FIG. 2.

Figure 2:
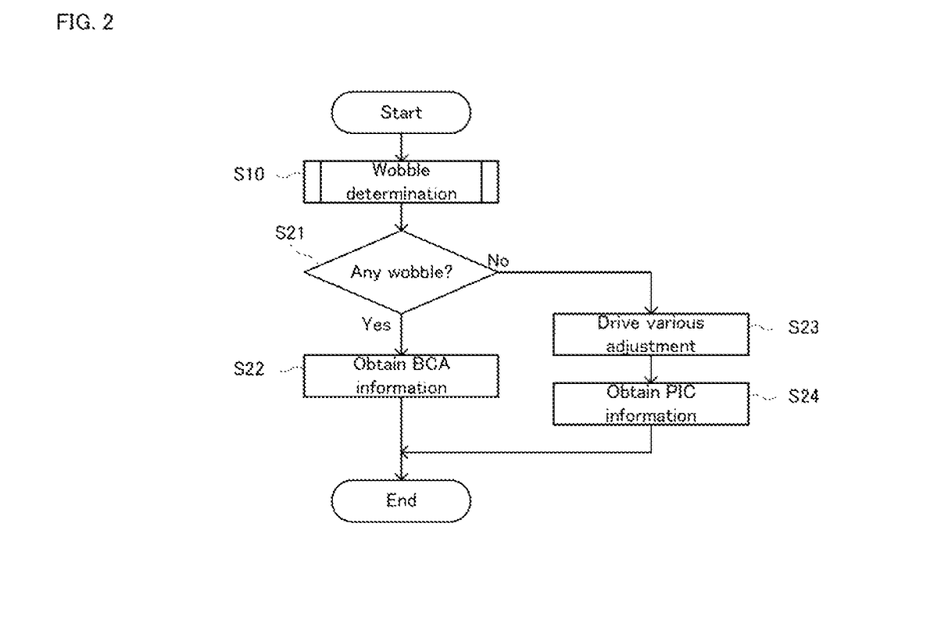
FIG. 2 is a flowchart illustrating disc type determination processing performed by the optical drive in the embodiment of the present invention.

In FIG. 2, firstly, the wobble determining apparatus 100, which is a part of the optical drive 1, performs wobble determination processing on the optical disc 20 (step S10). Then, the drive control apparatus 16 judges whether or not a wobble is formed on the optical disc 20 on the basis of a result of the wobble determination processing (step S21).

If it is judged that the wobble is formed on the optical disc 20 (i.e. if it is judged that the optical disc 20 is a recording type optical disc) (the step S21: Yes), the drive control apparatus 16 controls the driver unit 15 via the signal processing unit 14 to read BCA information which is recorded in an inner circumferential portion of the optical disc 20 (step S22).

On the other hand, if it is judged that the wobble is not formed on the optical disc 20 (i.e. if it is judged that the optical disc 20 is a reproduction-only type optical disc) (the step S21: No), the drive control apparatus 16 controls the driver unit 15 via the signal processing unit 14 to perform various adjustment such as tilt adjustment (step S23). Then, the drive control apparatus 16 controls the driver unit 15 via the signal processing unit 14 to read PIC information which is recorded in the inner circumferential portion of the optical disc 20 (step S24).

Incidentally, the disc determination processing can apply not only the aspect illustrated in the flowchart in FIG. 2 but also various known aspects. Specifically, for example, another processing may be performed instead of the reading of the BCA information or PIC information.

(Wobble Determination Processing)

The details of the wobble determination will be explained with reference to FIG. 3 to FIG. 7.

The wobble determination processing is performed in the inner circumferential portion of the optical disc 20 in which there is little influence of surface runout or the like, in many cases. On the other hand, with thinning the optical drive 1, the spindle motor 11 is designed to have relatively low power output. Then, if the wobble determination processing is performed in the inner circumferential portion of the optical disc 20, it likely takes a relatively long period of time to reach a number of revolutions which allows a predetermined linear velocity. This results in a possibility that a time required for the wobble determination processing and the disk determination processing is relatively long.

Thus, in the embodiment, the wobble determination processing is performed in a relatively outer circumferential portion of the optical disc 20 to reduce the time required for the wobble determination processing and the like. However, depending on the number of revolutions of the spindle motor 11, in some cases, it takes more time for the wobble determination processing if the position of the thread mechanism 13 is changed to the outer circumferential portion side of the optical disc 20. Thus, particularly in the embodiment, a first time Tr, which is a time length required until the number of revolutions of the spindle motor 11 reaches the number of revolutions which allows the predetermined linear velocity if the position of the thread mechanism 13 is not changed, and a second time Tp, which is a time length required until the thread mechanism 13 moves to a position which allows the predetermined linear velocity with the current number of revolutions of the spindle motor 11, are calculated and compared, thereby to determine whether or not the position of the thread mechanism 13 is changed.

Figure 3:
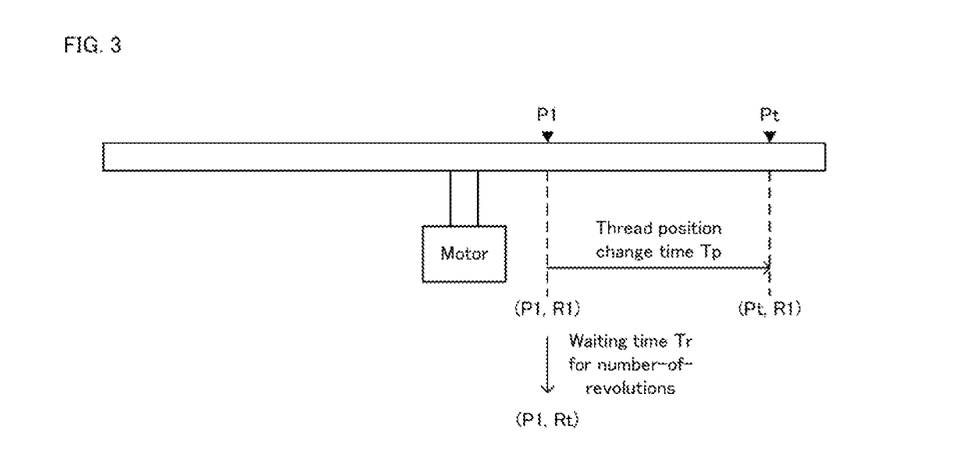
FIG. 3 is a conceptual diagram illustrating concepts of a waiting time for number-of-revolutions and a thread position change time.

Specifically, for example, it is assumed that an initial position of the thread mechanism 13 is a position P1 in FIG. 3, and that the number of revolutions of the spindle motor 11 at the start of the wobble determination processing is a number of revolutions R1. The drive control apparatus 16 calculates a number of revolutions (i.e. a target number of revolutions Rt) of the spindle motor 11 which allows the predetermined linear velocity at the current position (the position P1 at this time) of the thread mechanism 13. The drive control apparatus 16 then calculates the first time Tr which is required until wen the number of revolutions of the spindle motor 11 increases the calculated target number of revolutions Rt from the current number of revolutions (the number of revolutions R1 at this time), on the basis of R-T characteristics stored in advance in the memory 17 (refer to FIG. 4).

The drive control apparatus 16 calculates a position (i.e. a target position Pt) of the thread mechanism 13 which allows the predetermined linear velocity with the current number of revolutions (the number of revolutions R1 at this time) of the spindle motor 11 before or after or in parallel with the calculation of the first time Tr. The drive control apparatus 16 then calculates the second time Tp which is required until the thread mechanism 13 moves to the calculated target position Pt from the current position (the position P1 at this time), on the basis of P-T characteristics stored in advance in the memory 17 (refer to FIG. 5).

The drive control apparatus 16 then compares the calculated first time Tr and the calculated second time Tp. As a result of the comparison, if the first time Tr is less than the second time Tp, the drive control apparatus 16 controls the driver unit 15 via the signal processing unit 14 to wait until the number of revolutions of the spindle motor 11 reaches the target number of revolutions Rt without changing the position of the thread mechanism 13. On the other hand, if the first time Tr is greater than the second time Tp, the drive control apparatus 16 controls the driver unit 15 via the signal processing unit 14 to change the position of the thread mechanism 13 to the target position Pt.

Figure 4:
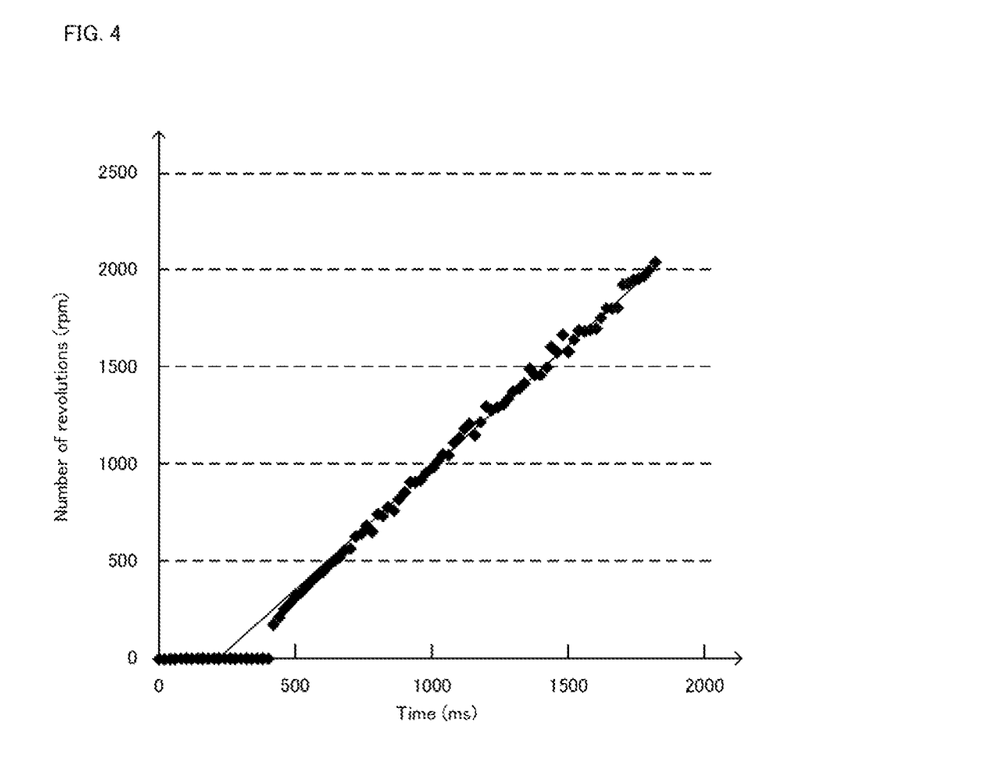
FIG. 4 is a diagram illustrating one example of R-T characteristics, which is a relation between the number of revolutions (R) of a spindle motor and a number-of-revolutions arrival time (T).
Figure 5:
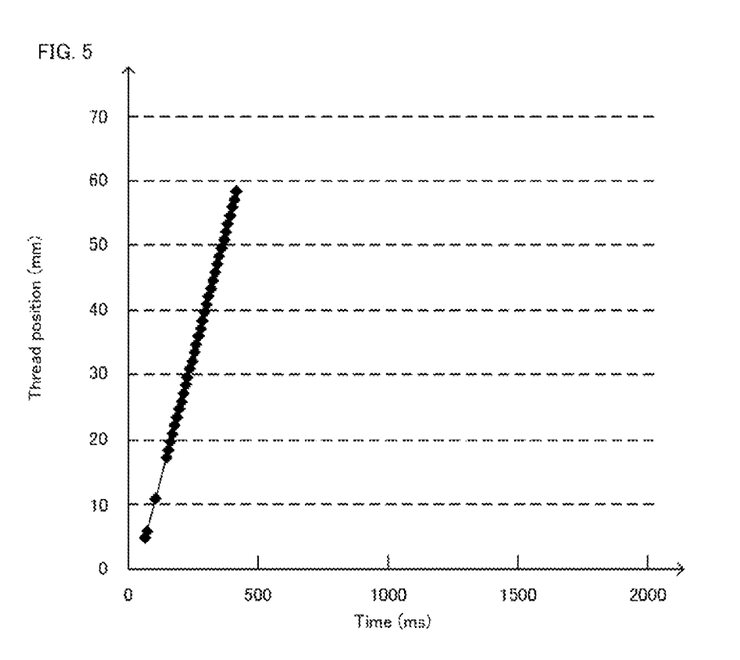
FIG. 5 is a diagram illustrating one example of P-T characteristics, which is a relation between a position (P) of a thread mechanism and a transit time (T).

FIG. 3 is a conceptual diagram illustrating concepts of a number-of-revolutions waiting time and a thread position change time. FIG. 4 illustrates one example of the R-T characteristics, which is a relation between the number of revolutions (R) of the spindle motor and a number-of-revolutions arrival time (T). FIG. 5 illustrates one example of the P-T characteristics, which is a relation between the position (P) of the thread mechanism and a transit time (T). In FIG. 4 and FIG. 5, diamond symbols represent measured values, and a solid line is an approximate curve based on the measured values.

Incidentally, if the target position Pt of the thread mechanism 13 is calculated, the target position Pt may be calculated in view of an increase ΔR in the number of revolutions of the spindle motor 11 during the movement of the thread mechanism 13 from the current position (the position P1 in FIG. 3) to the target position Pt.

If the calculated target position Pt exceeds the size of the optical disc 20 (specifically, for example, 58.1 mm in an optical disc with a diameter of 12 cm, and 38.1 mm in an optical disc with a diameter of 8 cm), the sum of the following two time lengths may be calculated as the second time Tp; one is a time in which the thread mechanism 13 moves from the current position to an outermost circumferential portion of the optical disc 20, and the other is a time which is required until reaching the number of revolutions of the spindle motor 11 which allows the predetermined linear velocity in the outermost circumferential portion.

In this case, in order to suppress the influence of the surface runout of the optical disc 20, the sum of the following two time lengths may be calculated as the second time Tp; one is a time in which the thread mechanism 13 moves to a position a predetermined distance (e.g. 2 mm) inner from the outermost circumferential portion of the optical disc 20, and the other is a time which is required until reaching the number of revolutions of the spindle motor 11 which allows the predetermined linear velocity in the portion.

Next, the wobble determination processing will be explained with reference to flowcharts in FIG. 6 and FIG. 7.

Figure 6:
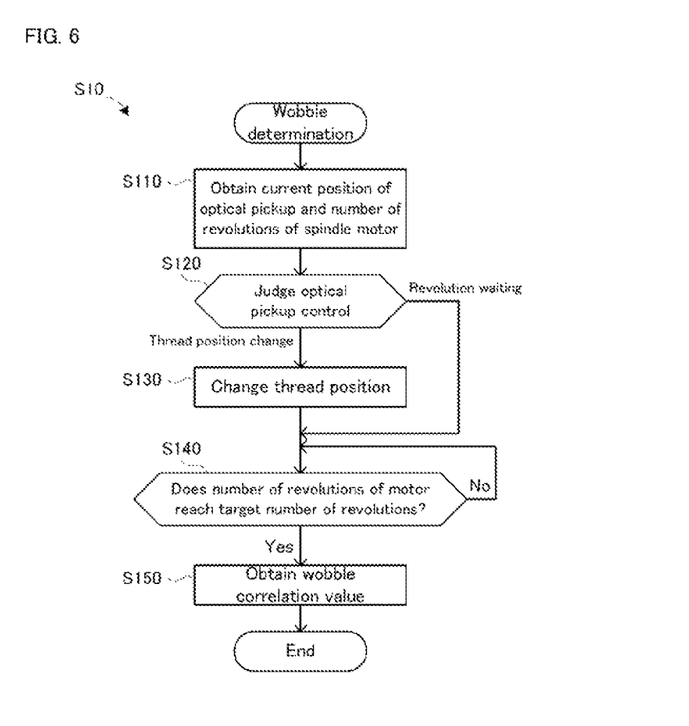
FIG. 6 is a flowchart illustrating wobble determination processing performed by the optical drive in the embodiment of the present invention.

In FIG. 6, firstly, the drive control apparatus 16 obtains the current position of the optical pickup 12 (or the thread mechanism 13) and the current number of revolutions of the spindle motor 11, on the basis of respective signals outputted from the number-of-revolutions sensor and the position sensor (step S110). The drive control apparatus 16 then performs optical pickup control judgment processing (refer to FIG. 7) (step S120).

Figure 7:
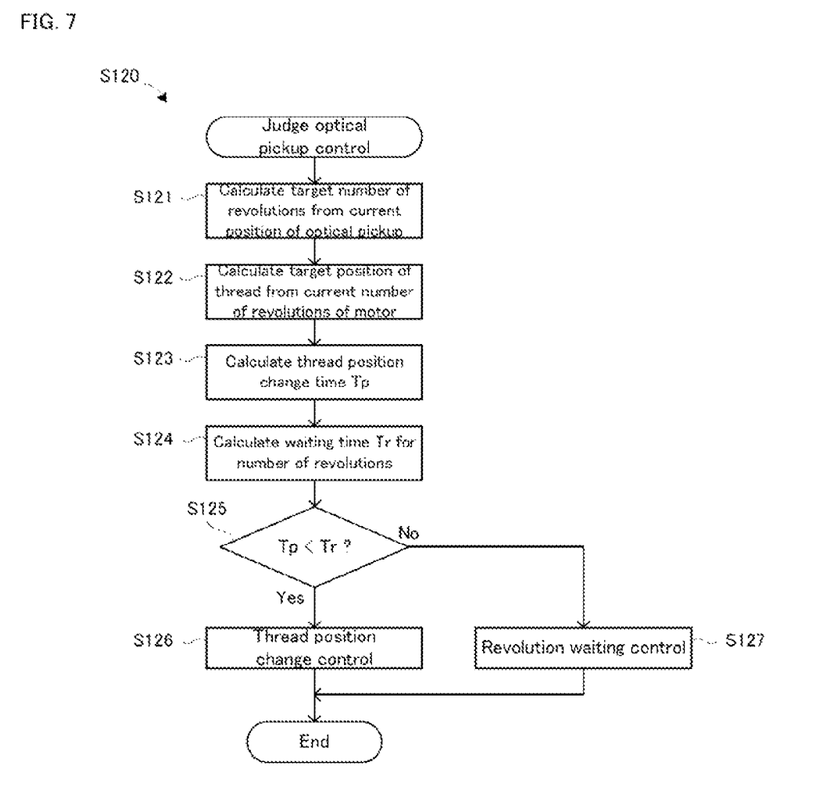
FIG. 7 is a flowchart illustrating optical pickup control judgment processing performed by the optical drive in the embodiment of the present invention.

In FIG. 7, the drive control apparatus 16 calculates the target number of revolutions of the spindle motor 11 at the current position of the optical pickup 12 (step S121). Before or after or in parallel with the processing in the step S121, the drive control apparatus 16 calculates, as the target position of the thread mechanism 13, the position which allows the predetermined linear velocity with the current number of revolutions of the spindle motor 11 (step S122).

The drive control apparatus 16 then calculates the second time Tp which is required until the thread mechanism 13 moves to the calculated target position from the current position (step S123). Before or after or in parallel with the processing in the step S122, the drive control apparatus 16 calculates the first time Tr which is required until the number of revolutions of the spindle motor 11 reaches the calculated target number of revolutions (step S124).

The drive control apparatus 16 then judges whether or not the second time Tp is less than the first time Tr (step S125). If it is judged that the second time Tp is less than the first time Tr (the step S125: Yes), the drive control apparatus 16 determines the implementation of thread position change control (step S126). On the other hand, if it is judged that the second time Tp is greater than the first time Tr (the step S125: No), the drive control apparatus 16 determines the implementation of revolution waiting control (step S127). If the second time Tp and the first time Tr are "equal", it may be included and treated in either one of the cases.

Back in FIG. 6 again, if determining the implementation of the thread position change control, the drive control apparatus 16 controls the driver unit 15 via the signal processing unit 14 to move the thread mechanism 13 to the calculated target position from the current position (step S130). On the other hand, if determining the implementation of the revolution waiting control, the drive control apparatus 16 controls the driver unit 15 via the signal processing unit 14 to wait without changing the position of the thread mechanism 13, and then performs processing in a step S140 described later.

The drive control apparatus 16 then judges whether or not the number of revolutions of the spindle motor 11 reaches the target number of revolutions which allows the predetermined linear velocity, on the basis of the signal outputted from the number-of-revolutions sensor (step S140). If it is judged that the number of revolutions of the spindle motor 11 does not reach the target number of revolutions (the step S140: No), the drive control apparatus 16 performs the processing in the step S140 again (in other words, waits until the number of revolutions of the spindle motor 11 reaches the target number of revolutions).

If it is judged that the number of revolutions of the spindle motor 11 reaches the target number of revolutions (the step S140: Yes), the drive control apparatus 16 extracts a wobble component contained in, for example, a tracking error signal, and compares the extracted wobble component with a reference signal to obtain a wobble correlation value (step S150). The "reference signal" is, for example, a signal with a frequency of 956.522 kHz if the optical disc 20 is BD-R/-RE. A method of obtaining the wobble co relation value can apply various known aspects.

The "drive control apparatus 16" in the embodiment is one example of the "calculating device", the "judging device" and the "controlling device" of the present invention. The "spindle motor 11", the "optical pickup 12", the "thread mechanism 13", the "first time Tr", and the "second time Tp" in the embodiment are one example of the "motor", the "optical head", the "moving device", the "first time", and the "second time" of the present invention, respectively. In the embodiment, a part of members which constitute the optical drive 1 is used at least as a part of the wobble determining apparatus.

Modified Example

Next, a modified example of the wobble determination processing in the embodiment will be explained.

In the modified example, the drive control apparatus 16 judges whether or not a value which is "twice" the second time Tp is less than the first time Tr, in the processing in the step S125 described above. If it is judged that the value which is twice the second time Tp is less than the first time Tr, the drive control apparatus 16 determines the implementation of the thread position change control. On the other hand, if it is judged that the value which is twice the second time Tp is greater than the first time Tr, the drive control apparatus 16 determines the implementation of the revolution waiting control.

As illustrated in the flowchart in FIG. 2, in the optical drive 1, the BCA information or PIC information located in the inner circumferential portion of the optical disc 20 is obtained after the wobble determination processing (the step S10). Thus, if the position of the thread mechanism 13 is changed to the outer circumferential portion of the optical disc 20 for the wobble determination processing, it is necessary to move the thread mechanism 13 to the inner circumferential portion of the optical disc 20 again in order to obtain the BCA information or the like. In this case, even if the second time Tp is less than the first time Tr, the processing time of the entire disc judgment processing is likely not reduced or is likely prolonged.

Thus, as described above, if the thread position change control is performed when the value which is twice the second time Tp is less than the first time Tr, the processing time of the entire disc judgment processing can be certainly reduced, and it is extremely useful in practice.

The present invention is not limited to the aforementioned embodiments, but various changes may be made, if desired, without departing from the essence or spirit of the invention which can be read from the claims and the entire specification. A wobble determining apparatus and method, an optical disk apparatus, and a computer program, which involve such changes, are also intended to be within the technical scope of the present invention.

DESCRIPTION OF REFERENCE CODES 1 optical drive
11 spindle motor
12 optical pickup
13 thread mechanism
14 signal processing unit
15 driver unit
16 drive control apparatus
17 memory
18 interface
20 optical disc
100 wobble determining apparatus

The invention claimed is:

1. A wobble determining apparatus which is mounted on an optical disk apparatus, the optical disk apparatus comprising: a motor which can rotate an optical disc, an optical head which can record information on the optical disc or which can read the information recorded on the optical disc, and a moving device which can move the optical head at least along a recording surface of the optical disc, said wobble determining apparatus comprising:
a number-of-revolutions detecting device for detecting the number of revolutions of the motor;
a position detecting device for detecting a position of the optical head with respect to the optical disc;
a calculating device for calculating (i) a first time, which is a time length required until reaching a number of revolutions of the motor which allows a predetermined linear velocity at the detected position, and (ii) a second time, which is a time length required to move the optical head to a position which allows the predetermined linear velocity with the detected number of revolutions, on the basis of the detected number of revolutions and the detected position;
a judging device for judging whether or not to keep the optical head at the detected position in accordance with the calculated first time and the calculated second time; and
a controlling device for controlling the moving device not to move the optical head if it is judged to keep the optical head at the detected position, and for controlling the moving device to move the optical head to the position which allows the predetermined linear velocity if it is judged not to keep the optical head at the detected position.

2. The wobble determining apparatus according to claim 1, wherein
said judging device
judges to keep the optical head at the detected position if the calculated first time is less than the calculated second time, and
judges not to keep the optical head at the detected position if the calculated first time is greater than the calculated second time.

3. The wobble determining apparatus according to claim 1, wherein
said judging device
judges to keep the optical head at the detected position if the calculated first time is less than a time which is twice the calculated second time, and
judges not to keep the optical head at the detected position if the calculated first time is greater than the time which is twice the calculated second time.

4. The wobble determining apparatus according to claim 1, wherein said calculating device calculates, as the second time, a sum of a time which is required to move the optical head to an outermost circumferential portion of the optical disc, and a time which is required until reaching the number of revolutions of the motor which allows the predetermined linear velocity in the outer most circumferential portion, if the position which allows the predetermined linear velocity is outer than the outermost circumferential portion.

5. A wobble determining method in a wobble determining apparatus which is mounted on an optical disk apparatus, the optical disk apparatus comprising: a motor which can rotate an optical disc, an optical head which can record information on the optical disc or which can read the information recorded on the optical disc, and a moving device which can move the optical head at least along a recording surface of the optical disc, said wobble determining method comprising:
a number-of-revolutions detecting process of detecting the number of revolutions of the motor;
a position detecting process of detecting a position of the optical head with respect to the optical disc;
a calculating process of calculating (i) a first time, which is a time length required until reaching a number of revolutions of the motor which allows a predetermined linear velocity at the detected position, and (ii) a second time, which is a time length required to move the optical head to a position which allows the predetermined linear velocity with the detected number of revolutions, on the basis of the detected number of revolutions and the detected position;
a judging process of judging whether or not to keep the optical head at the detected position in accordance with the calculated first time and the calculated second time; and
a controlling process of controlling the moving device not to move the optical head if it is judged to keep the optical head at the detected position, and for controlling the moving device to move the optical head to the position which allows the predetermined linear velocity if it is judged not to keep the optical head at the detected position.

6. An optical disk apparatus comprising:
a motor which can rotate an optical disc;
an optical head which can record information on the optical disc or which can read the information recorded on the optical disc;
a moving device which can move the optical head at least along a recording surface of the optical disc;
a number-of-revolutions detecting device for detecting the number of revolutions of the motor;
a position detecting device for detecting a position of the optical head with respect to the optical disc;
a calculating device for calculating (i) a first time, which is a time length required until reaching a number of revolutions of the motor which allows a predetermined linear velocity at the detected position, and (ii) a second time, which is a time length required to move the optical head to a position which allows the predetermined linear velocity with the detected number of revolutions, on the basis of the detected number of revolutions and the detected position;
a judging device for judging whether or not to keep the optical head at the detected position in accordance with the calculated first time and the calculated second time; and
a controlling device for controlling the moving device not to move the optical head if it is judged to keep the optical head at the detected position, and for controlling the moving device to move the optical head to the position which allows the predetermined linear velocity if it is judged not to keep the optical head at the detected position.

7. A non-transitory computer readable medium storing a computer program for executing the method of claim 5.

* * * * *